US011623730B2

(12) United States Patent
Walter

(10) Patent No.: US 11,623,730 B2
(45) Date of Patent: Apr. 11, 2023

(54) CANOPY SEPARATION SYSTEMS AND METHODS FOR AN AIRCRAFT

(71) Applicant: THE BOEING COMPANY, Chicago, IL (US)

(72) Inventor: Matthew W. Walter, Troy, MO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 17/468,973

(22) Filed: Sep. 8, 2021

(65) Prior Publication Data

US 2022/0250732 A1    Aug. 11, 2022

Related U.S. Application Data

(60) Provisional application No. 63/146,048, filed on Feb. 5, 2021.

(51) Int. Cl.
*B64C 1/32* (2006.01)
*B64C 1/14* (2006.01)

(52) U.S. Cl.
CPC .............. *B64C 1/32* (2013.01); *B64C 1/1476* (2013.01); *B64C 1/1492* (2013.01)

(58) Field of Classification Search
CPC ........... B64C 1/14; B64C 1/32; B64C 1/1476; B64C 1/1492
See application file for complete search history.

(56) References Cited

U.S. PATENT DOCUMENTS

| 2,699,305 A | | 1/1955 | Turner | |
|---|---|---|---|---|
| 2,832,553 A | * | 4/1958 | Wallenhorst | B64C 1/32 244/121 |
| 3,194,517 A | | 7/1965 | Morris | |
| 5,205,516 A | * | 4/1993 | Bright | B64C 1/1476 244/121 |

FOREIGN PATENT DOCUMENTS

EP    0437982    7/1991

OTHER PUBLICATIONS

U.S. Appl. No. 16/869,035, filed May 7, 2020.
Extended European Search Report for EP 21206245.9-1010, dated Apr. 4, 2022.

* cited by examiner

*Primary Examiner* — Richard G Davis
(74) *Attorney, Agent, or Firm* — The Small Patent Law Group LLC; Joseph M. Butscher

(57) ABSTRACT

A canopy for an aircraft includes a pivot assembly including a first hinge and a second hinge opposite from the first hinge. The first hinge includes a first pivot slot having a first length. The first pivot slot is configured to retain a first aft pin of a fuselage of the aircraft. The second hinge includes a second pivot slot having a second length. The second pivot slot is configured to retain a second aft pin of the fuselage of the aircraft. The first length differs from the second length.

21 Claims, 9 Drawing Sheets

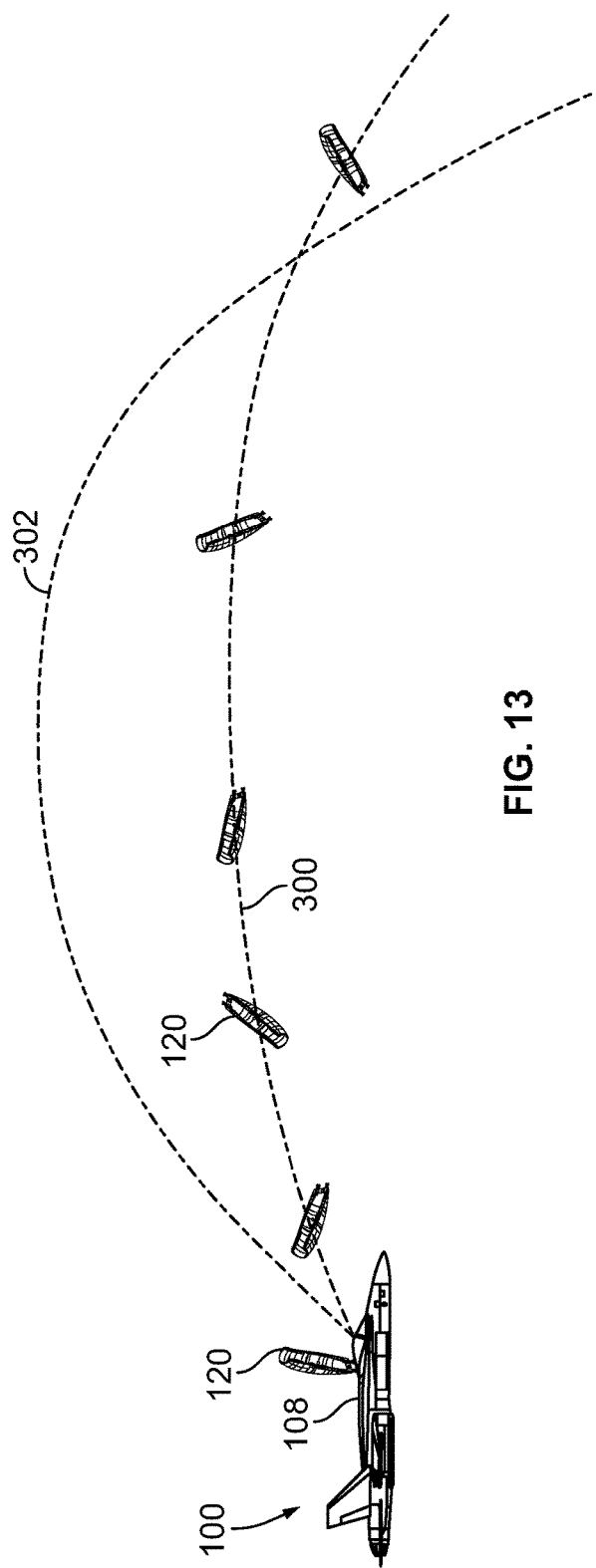
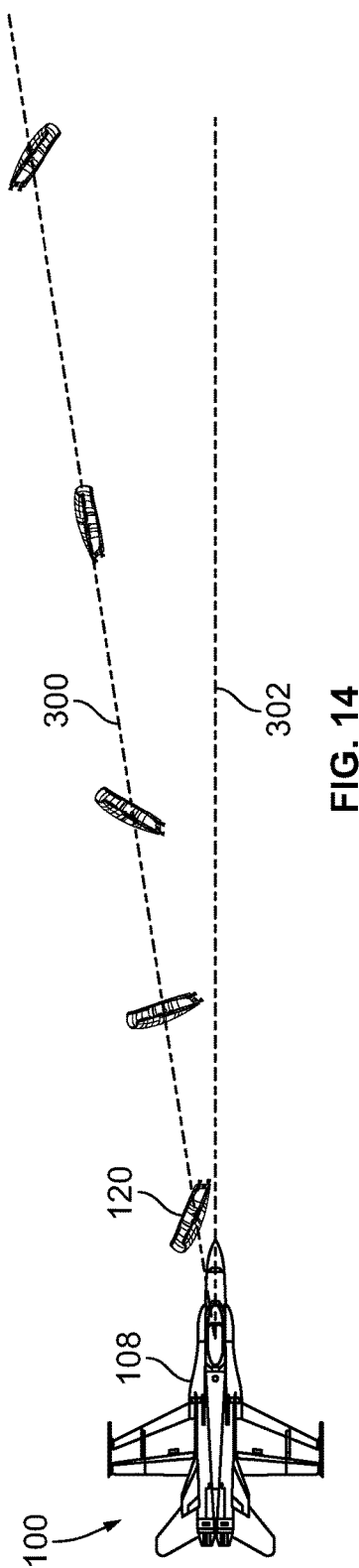

CANOPY SEPARATION SYSTEMS AND METHODS FOR AN AIRCRAFT

CROSS-REFERENCE TO RELATED APPLICATIONS

This application relates to and claims priority benefits from U.S. Provisional Application No. 63/146,048, entitled "Canopy Separation Systems and Methods for an Aircraft," filed Feb. 5, 2021, which is hereby incorporated by reference in its entirety.

STATEMENT REGARDING FEDERALLY SPONSORED RESEARCH OR DEVELOPMENT

The government may have rights in this invention under Department of Defense Contract 18-D-0107.

FIELD OF THE DISCLOSURE

Embodiments of the present disclosure generally relate to systems and methods for separating a canopy from a fuselage of an aircraft.

BACKGROUND OF THE DISCLOSURE

Certain aircraft include a canopy over a cockpit. For example, various military fighter jets include a canopy over a cockpit. The canopy is moveable between an open position, which allows a pilot to enter and exit the cockpit, and a closed position, such as during flight of the aircraft.

During a mission, a pilot may need to eject from the cockpit. For example, the aircraft may be impacted by adversarial ordnance, which may render the aircraft inoperable. As the pilot pulls an ejection seat firing handle to initiate an escape system, a transparency of the canopy is weakened or removed before the seat assembly, on which the pilot is seated, is ejected from the cockpit.

During ejection, the canopy is jettisoned prior to ejecting the occupant(s) of the cockpit to ensure a clear escape path. For an aircraft moving in a forward direction, as the canopy is jettisoned, the canopy continues to travel down range, such that the trajectory of the jettisoned canopy is dictated by gravity and aerodynamic forces. After the canopy is jettisoned, the occupant(s) are ejected from the aircraft via ejection seat(s).

In order to stop an impact between the jettisoned canopy and the aircrew from occurring, a known method utilizes trajectory divergent rocket motors on the ejection seat(s) to induce lateral motion of the ejection seat(s). Another known method induces a center of gravity offset into the canopy via a ballast. However, the additional rocket motors and/or ballasts add weight, complexity, and cost to the aircraft.

SUMMARY OF THE DISCLOSURE

A need exists for a system and a method for safely, efficiently, and effectively separating a canopy from a fuselage of an aircraft during an ejection procedure. Further, a need exists for such a system and a method that is less costly and less complex than known systems and methods. Additionally, a need exists for such a system and a method that does not add weight to the aircraft.

With those needs in mind, certain embodiments of the present disclosure provide a canopy for an aircraft. The canopy includes a pivot assembly including a first hinge and a second hinge opposite from the first hinge. The first hinge includes a first pivot slot having a first length. The first pivot slot is configured to retain a first aft pin of a fuselage of the aircraft. The second hinge includes a second pivot slot having a second length. The second pivot slot is configured to retain a second aft pin of the fuselage of the aircraft. The first length differs from the second length.

In at least one embodiment, the first length is longer than the second length by a distance that is substantially equal to a radius of one or both of the first aft pin or the second aft pin. As an example, the first length exceeds the second length by approximately 0.5 inches.

In at least one embodiment, one or both of the first hinge or the second hinge further includes one or more chamfers. As an example, the one or more chamfers slope from a pin-engaging surface to an interior surface.

In at least one embodiment, the first hinge further includes a first fork having a first upper prong separated from a first lower prong by the first pivot slot. The second hinge further includes a second fork having a second upper prong separated from a second lower prong by the second pivot slot.

As a further example, the first hinge further includes a first intermediate body having a first locking slot configured to retain a first fore pin of the fuselage of the aircraft. The second hinge further includes a second intermediate body having a second locking slot configured to retain a second fore pin of the fuselage of the aircraft.

As a further example, the first hinge further includes a first hinge cam extending from the first intermediate body. The second hinge further includes a second hinge cam extending from the second intermediate body.

In at least one embodiment, the canopy further includes a transparent cover secured to a frame. The pivot assembly extends from the frame. For example, the pivot assembly rearwardly extends from an aft end of the frame.

Certain embodiments of the present disclosure provide a method of forming a canopy for an aircraft. The method includes providing a pivot assembly with a first hinge and a second hinge opposite from the first hinge; forming a first pivot slot having a first length within the first hinge, wherein the first pivot slot is configured to retain a first aft pin of a fuselage of the aircraft; and forming a second pivot slot having a second length that differs from the first length within the second hinge, wherein the second pivot slot is configured to retain a second aft pin of the fuselage of the aircraft.

Certain embodiments of the present disclosure provide an aircraft including a fuselage including a first aft pin, a second aft pin, a first fore pin, and a second fore pin; and a canopy moveably coupled to the fuselage, as described herein. The canopy is configured to be move between an open position and closed position.

BRIEF DESCRIPTION OF THE DRAWINGS

FIG. 13 illustrates a lateral view of the aircraft as the canopy separates from the fuselage, according to an embodiment of the present disclosure.

FIG. 14 illustrates a top view of the aircraft as the canopy separates from the fuselage.

DETAILED DESCRIPTION OF THE DISCLOSURE

Figure 1:
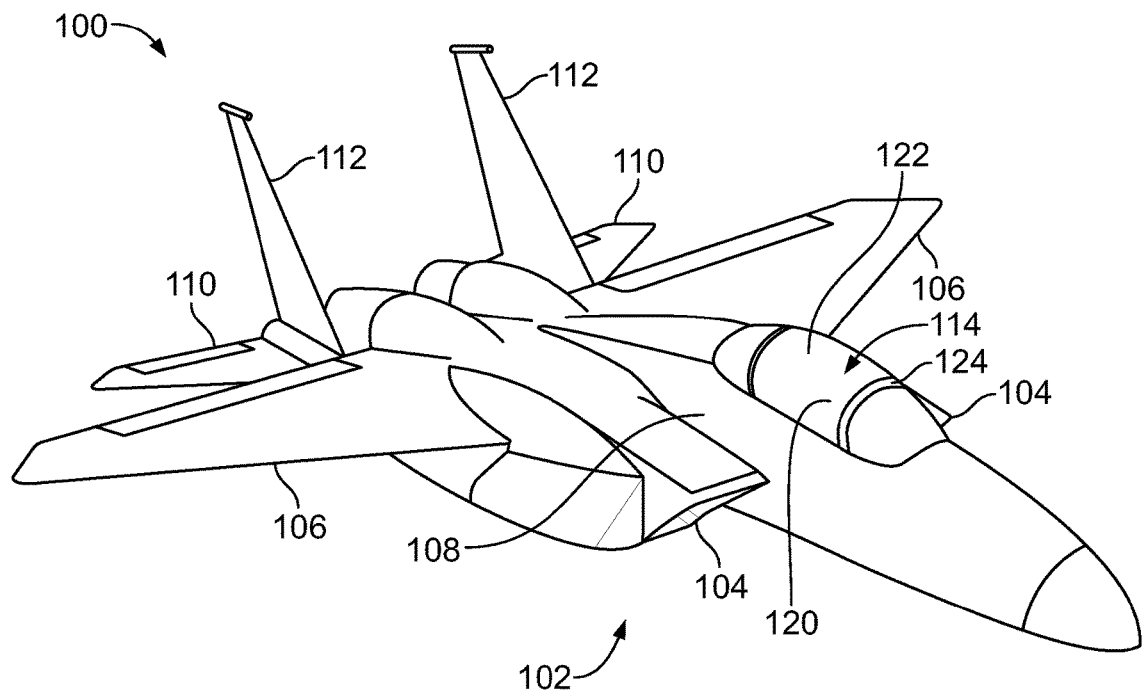
FIG. 1 illustrates a perspective front view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide a separating system and method for a canopy of an aircraft. The system and method are configured to mechanically induce a controlled rolling motion into the canopy via a canopy hinge design. The system and method include a pivot assembly having a first hinge opposite from a second hinge. A slot length differential exists between the first hinge and the second hinge. The slot length differential allows the effects of centrifugal acceleration, aerodynamic forces, and canopy jettison rocket motor thrust to impart a predictable and controlled rotational velocity about a longitudinal axis of the canopy. When the canopy rotates along the longitudinal axis, aerodynamic forces and canopy jettison rocket motor thrust impart lateral impulse and velocity into the canopy, causing the trajectory of the canopy to deviate from a trajectory of the ejected occupant(s) of the aircraft. The system and method prevent or otherwise reduce a potential of collision between a jettisoned aircraft canopy and the ejected occupant(s) during an emergency escape event.

The systems and methods described herein utilize centrifugal acceleration, radial translation, and external forces (such as caused by, for example, aerodynamic and jettison rocket motors) to impart rotational and lateral impulses into the canopy resulting in a trajectory that diverges from that of the ejection seat/occupant. The system and method introduce different slot lengths on opposed hinge mechanisms, for example. Embodiments of the present disclosure provide systems and methods that are repeatable and reliable, robust, and insensitive to mass property variables and/or future modification to the canopy system. Further, embodiments of the present disclosure allow for mathematical quantification and prediction of performance as well as optimization of pivot slot geometry. The ability to predict performance has the tendency to increase the probability of successfully demonstrating adequate canopy/aircrew trajectory separation during ejection sled testing. In contrast, previous aircraft platforms typically required multiple sled tests prior to realize an effective means for canopy lateral motion. Further, the systems and methods provide canopy separation systems and methods that are less costly than known systems and methods.

As described herein, the slot length differential (difference in length of pivot slots) of the canopy produces a rolling motion of the canopy via the hinge as the canopy separates from the fuselage of the aircraft.

FIG. 1 illustrates a perspective front view of an aircraft 100, according to an embodiment of the present disclosure. As shown, the aircraft 100 is a military fighter jet. The aircraft 100 includes a propulsion system 102 that includes two engines 104, for example. Optionally, the propulsion system 102 may include more or less engines 104 than shown. The engines 104 are carried by wings 106 and/or a fuselage 108 of the aircraft 100. In other embodiments, the engines 104 may be carried by other portions of the aircraft 100. The fuselage 108 also supports horizontal stabilizers 110 and vertical stabilizers 112. The fuselage 108 of the aircraft 100 includes the cockpit 114 covered by a canopy 120. Optionally, the aircraft 100 may be various other types of military aircraft. Alternatively, the aircraft may be various types of commercial aircraft.

The canopy 120 includes a transparent cover 122 secured to a frame 124. The transparent cover 122 is formed of a robust, sturdy, and transparent material, such as acrylic. The frame 124 may be formed of metal. The canopy 120 is moveable between an open position, in which a pilot may enter and exit the cockpit, and a closed position, such as during flight of the aircraft 100.

The cockpit 114 includes a seat assembly (not shown). In at least one embodiment, the assembly includes pyrotechnic components, such as rockets, integrated therein, to allow for ejection of the seat assembly. An eject mechanism (not shown) is disposed within the cockpit 114. The eject mechanism may be secured to a portion of the seat assembly. The eject mechanism may be an eject handle or button, for example.

Figure 2:
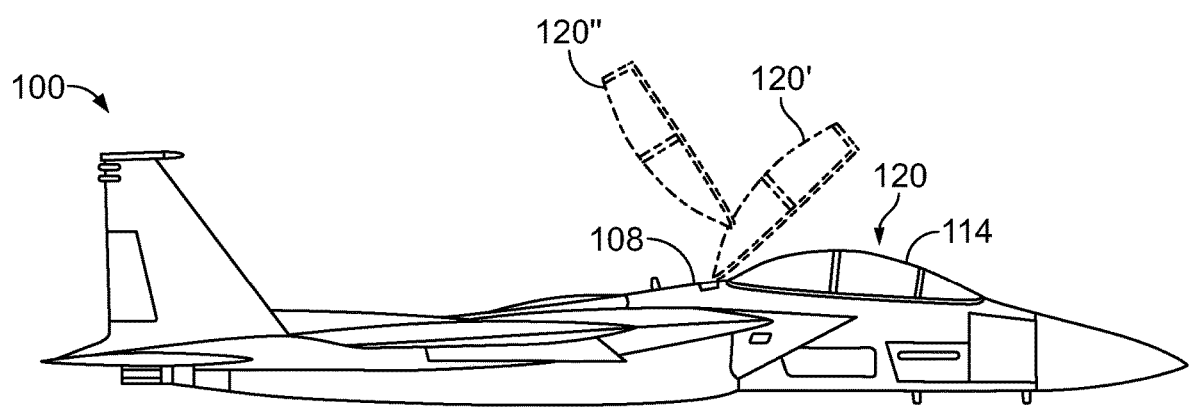
FIG. 2 illustrates a lateral view of the aircraft of FIG. 1.

FIG. 2 illustrates a lateral view of the aircraft 100 of FIG. 1. During an emergency ejection process, the canopy 120 is jettisoned to ensure a safe, unimpeded path for the ejection of the seat(s) that support the occupant(s). As an example, during the ejection process, an occupant (such as a pilot) pulls an ejection seat handle within the cockpit 114. In response, the canopy 120 linearly translates to unlock, such as via pyrotechnic thrusters. The canopy 120 rotates about aircraft pivot pins, such as via canopy jettison rocket motors or other pyrotechnic devices to rotate rearwardly to positions 120' and 120'', for example. A signal indicating an ejection sequence is sent. The signal indicates that the canopy 120 has rotated to a predetermined angle to trigger a seat firing sequence. The seat(s) and occupant(s) are then ejected.

Figure 3:
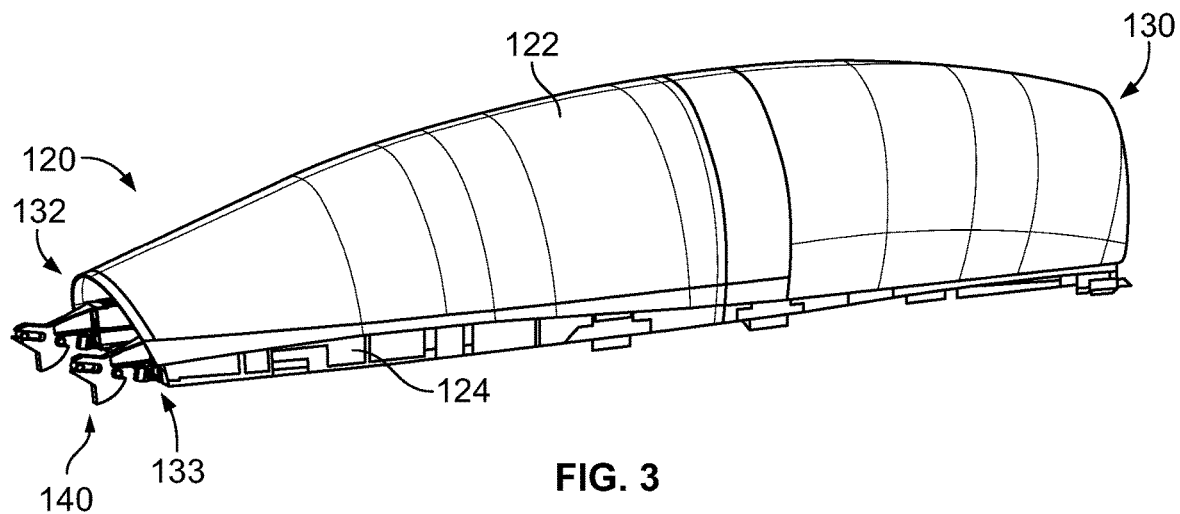
FIG. 3 illustrates a perspective lateral view of a canopy, according to an embodiment of the present disclosure.

FIG. 3 illustrates a perspective lateral view of the canopy 120, according to an embodiment of the present disclosure. The canopy 120 includes the transparent cover 122 coupled to the frame 124. The canopy 120 includes a fore end 130 and an aft end 132 that is opposite from the fore end 130.

A pivot assembly 140 connects to the frame 124. For example, the pivot assembly 140 rearwardly extends from an aft end 133 of the frame 124. Referring to FIGS. 1-3, the pivot assembly 140 pivotally connects to portions of the fuselage 108 to allow the canopy 120 to open and close relative to the fuselage 108. In at least one embodiment, the pivot assembly 140 pivotally couples to pivot pins of the fuselage 108.

Figure 4:
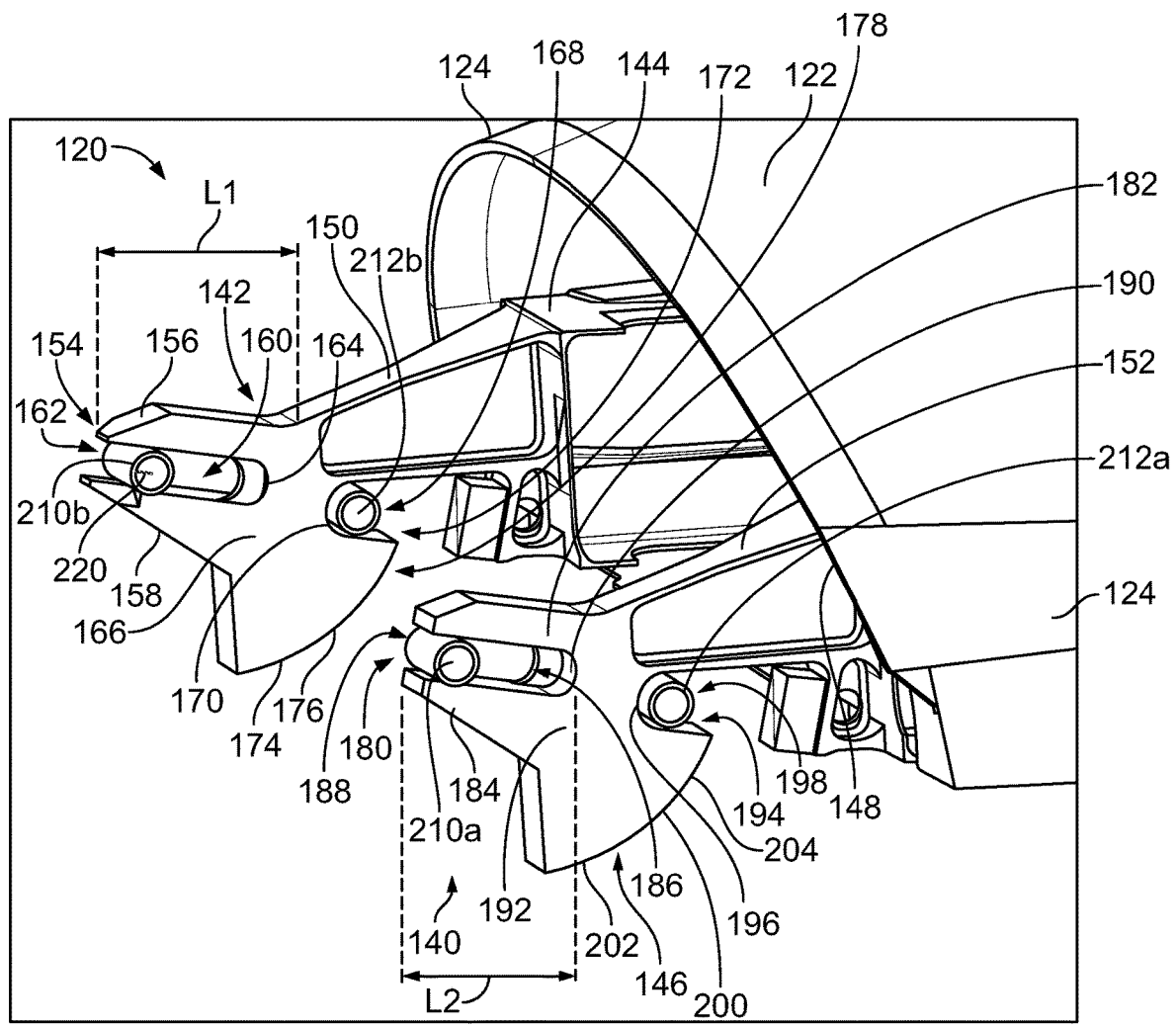
FIG. 4 illustrates a perspective lateral view of a pivot assembly of the canopy, according to an embodiment of the present disclosure.

FIG. 4 illustrates a perspective lateral view of the pivot assembly 140 of the canopy 120, according to an embodiment of the present disclosure. The pivot assembly 140 includes a first hinge 142 extending rearwardly from a first side 144 of the frame 124, and a second hinge 146 extending rearwardly from a second side 148 of the frame 124. The first hinge 142 is opposite from the second hinge 146. That is, the first hinge 142 is on a first side of the canopy 120, and the second hinge 146 is on an opposite second side of the canopy 120. The first hinge 142 can connect to the frame 124 through a first extension beam 150, and the second hinge 146 can connect to the frame 124 through a second extension beam 152. Optionally, the first hinge 142 and the second hinge 146 can connect to the frame 124 without extension beams.

The first hinge 142 includes a first fork 154 having an upper prong 156 separated from a lower prong 158 by a first pivot slot 160 having an open aft end 162 and a closed fore end 164. The first fork 154 connects to an intermediate body 166 having a first locking slot 168 having a closed aft end 170 and an open fore end 172. A hinge cam 174 having an outer arcuate surface 176 at a fore end 178 extends from (such as below) the intermediate body 166.

Similarly, the second hinge 146 includes a second fork 180 having an upper prong 182 separated from a lower prong 184 by a second pivot slot 186 having an open aft end 188 and a closed fore end 190. The second fork 180 connects to an intermediate body 192 having a second locking slot 194 having a closed aft end 196 and an open fore end 198. A hinge cam 200 having an outer arcuate surface 202 at a fore end 204 extends from (such as below) the intermediate body 192.

Referring to FIGS. 1-4, the fuselage 108 includes first and second aft pins 210a, 210b and first and second fore pins 212a, 212b. The aft pins 210a, 210b and the fore pins 212a, 212b are fixed structures of the fuselage 108 onto which the pivot assembly 140 secures. The pivot assembly 140 pivotally secures to the aft pins 210a, 210b and the fore pins 212a, 212b. For example, the first pivot slot 160 retains an aft pin 210a, and the second pivot slot 186 retains an aft pin 210b. The first locking slot 168 retains a first fore pin 212a (for example, a cam roller), and the second locking slot 194 retains a second fore pin 212b.

The first fork 154 includes a first length L1. The upper prong 156 and the lower prong 158 have the length L1, thereby providing the first pivot slot 160 with the length L1. The second fork 180 includes a second length L2, which differs from L1. In particular, the second length L2 is less than the first length L1. The upper prong 182 and the lower prong 184 have the length L2, thereby providing the second pivot slot 186 with the length L2. Optionally, the first length L1 may be less than the second length L2.

In at least one embodiment, the length L1 exceeds the second length L2 by a distance that equals (or substantially equals, such as within +/−0.1 inches) a radius 220 of a pin, such as the aft pin 210a. Put differently, the second length L2 is shorter than the first length L1 by a distance that equals (or substantially equals) a radius 220 of a pin. The aft pins 210a, 210b and the fore pins 212a, 212b can have the same radius. As an example, the first length L1 can be 0.5 inches or approximately 0.5 inches (such as +/−0.1 inches) longer than the second length L2 (or the second length L2 is 0.5 inches shorter than the first length L1). Optionally, the difference between the first length L1 and the second length L2 can be greater or less than 0.5 inches. For example, the difference between the first length L1 and the second length L2 can be between 0.1 inch to 1.5 inches. It has been found that the difference between the first length L1 and the second length L2 being 0.5 inches ensures a desired separation between the canopy 120 and the fuselage 108 that reduces the potential of collision with an ejecting occupant during an ejection event.

Figure 5:
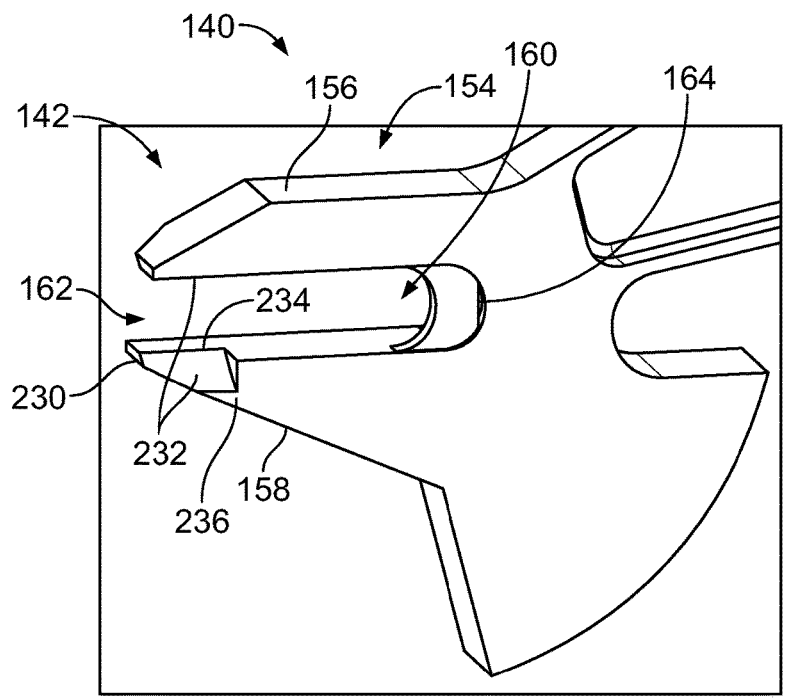
FIG. 5 illustrates a perspective interior view of a first hinge of the pivot assembly, according to an embodiment of the present disclosure.

FIG. 5 illustrates a perspective interior view of the first hinge 142 of the pivot assembly 140, according to an embodiment of the present disclosure. For clarity, the second hinge 146 (shown in FIG. 4) is not shown in FIG. 5. An aft end 230 of the lower prong 158, such as a distal tip, has a chamfer 232 (for example, a beveled surface) such as on a pin-engaging surface 234 and an interior surface 236. For example, the chamfer 232 is an angled surface that provides a slope between the pin-engaging surface 234 and the interior surface 236. In at least one embodiment, the upper prong 156 also includes a chamfer 232. Referring to FIGS. 4 and 5, each of the upper prong 156, the lower prong 158, the upper prong 182, and the lower prong 184 includes a chamfer 232. Accordingly, at least one of the upper prong 156, the lower prong 158, the upper prong 182, and the lower prong 184 includes a chamfer 232. The chamfer(s) 232 reduces the potential of binding between the first and second hinges 142 and 146 and respective aft pins 210a, 210b as the canopy 120 separates from the fuselage 108. Alternatively, the first hinge 142 and the second hinge 146 may not include any chamfers.

Referring to FIGS. 1-6, embodiments of the present disclosure provide the canopy 120 for the aircraft 100. The canopy 120 includes the pivot assembly 140 including the first hinge 142 and the second hinge 146 opposite from the first hinge 142. The first hinge 142 includes the first pivot slot 160 having the first length L1. The first pivot slot 160 is configured to retain a first aft pin 210a or 210b of the fuselage 108 of the aircraft 100. The second hinge 146 includes the second pivot slot 186 having the second length L2. The second pivot slot 186 is configured to retain a second aft pin 210a or 212b of the fuselage 108 of the aircraft 100. The first length L1 differs from the second length L2. For example, the first length L1 is longer than the second length by a distance that is substantially equal to the radius 220, such as of one or both of the first aft pin 210a or the second aft pin 210a. As a further example, the first length L1 exceeds the second length L2 by approximately 0.5 inches.

In at least one embodiment, one or both of the first hinge 142 or the second hinge 146 further includes one or more chamfers 232. As an example, the chamfer(s) 232 slope from a pin-engaging surface 234 to an interior surface 236.

Figures 6, 7:
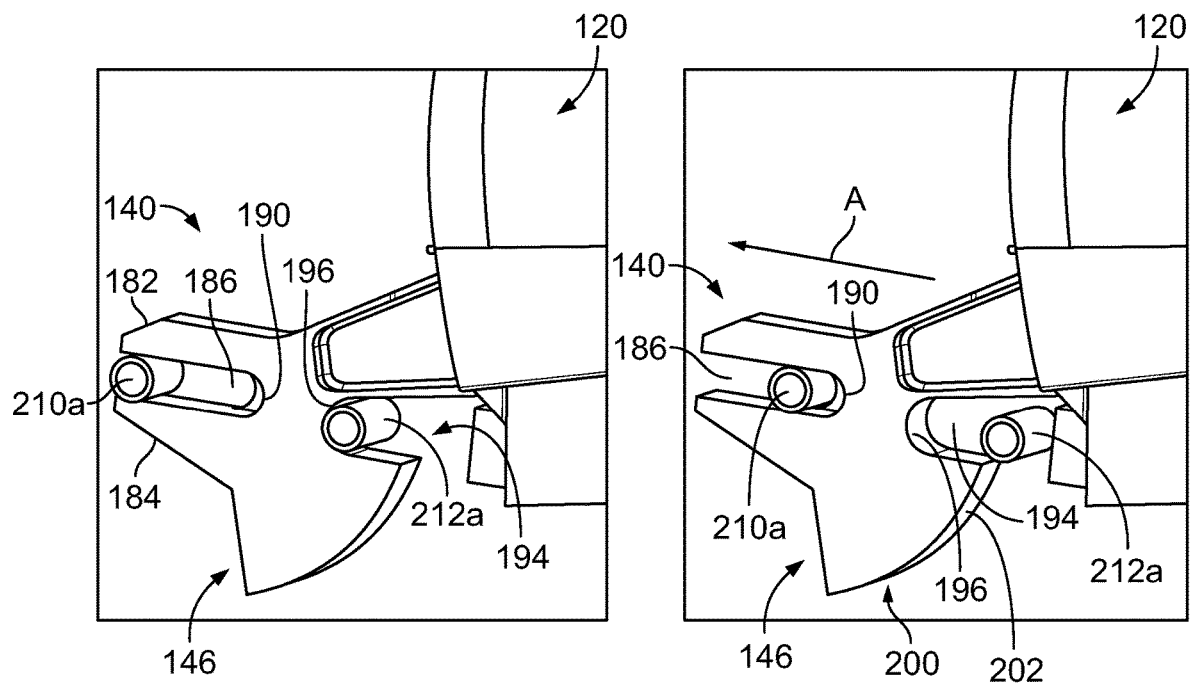
FIG. 6 illustrates a perspective lateral view of a second hinge of the pivot assembly when the canopy is in a closed and locked state, according to an embodiment of the present disclosure.
FIG. 7 illustrates a perspective lateral view of the second hinge of the pivot assembly during a first phase of an ejection event, according to an embodiment of the present disclosure.

FIG. 6 illustrates a perspective lateral view of the second hinge 146 of the pivot assembly 140 when the canopy 120 is in a closed and locked state, according to an embodiment of the present disclosure. For the sake of clarity, the first hinge 142 (shown in FIG. 4) is not shown in FIG. 6. Referring to FIGS. 1-6, during flight, for example, the canopy 120 is in the closed and locked state, such that the fore pin 212 is nested into the closed aft end 196 of the second locking slot 194 (a fore pin 212 is similarly nested into the closed aft end 170 of the first locking slot 168). Meanwhile, the aft pin 210b is spaced away from the closed fore end 190 of the second pivot slot 186, and is positioned between distal tips of the upper prong 182 and the lower prong 184 (an aft pin 210a is similarly positioned in the first pivot slot 160). In this position, the aft pins 210a, 210b may rest on chamfers 232.

FIG. 7 illustrates a perspective lateral view of the second hinge 146 of the pivot assembly 140 during a first phase of an ejection event, according to an embodiment of the present disclosure. As an emergency ejection is initiated, the canopy 120 is driven rearwardly in the direction of arrow A, such that the fore pin 212b slides through the second locking slot 194 away from the closed aft end 190, while the aft pin 210a slides through the second pivot slot 186 toward the closed fore end 190. The fore pin 212b moves out of the second locking slot 194 and engages the arcuate outer surface 202 of the hinge cam 200. The canopy 120 is now unlocked and is free rotate about the aft pins 210a, 210b.

Figure 8:
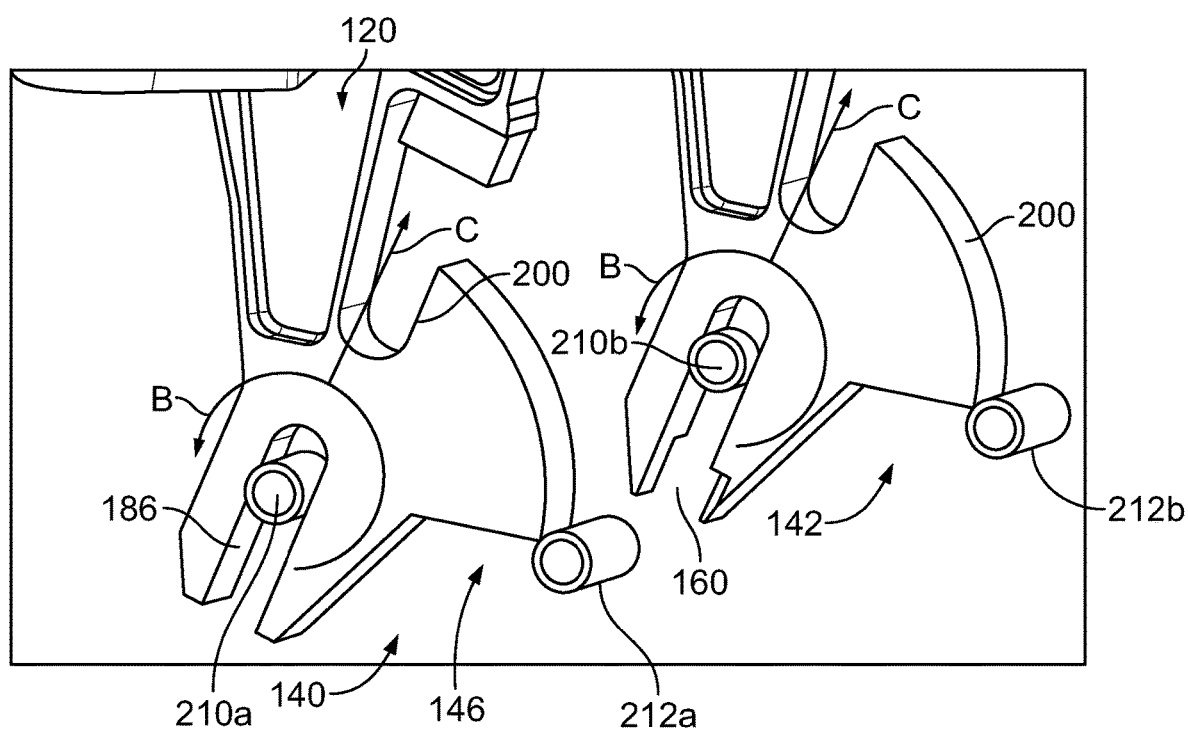
FIG. 8 illustrates a perspective lateral view of the pivot assembly during a second phase of an ejection event, according to an embodiment of the present disclosure.
Figure 10:
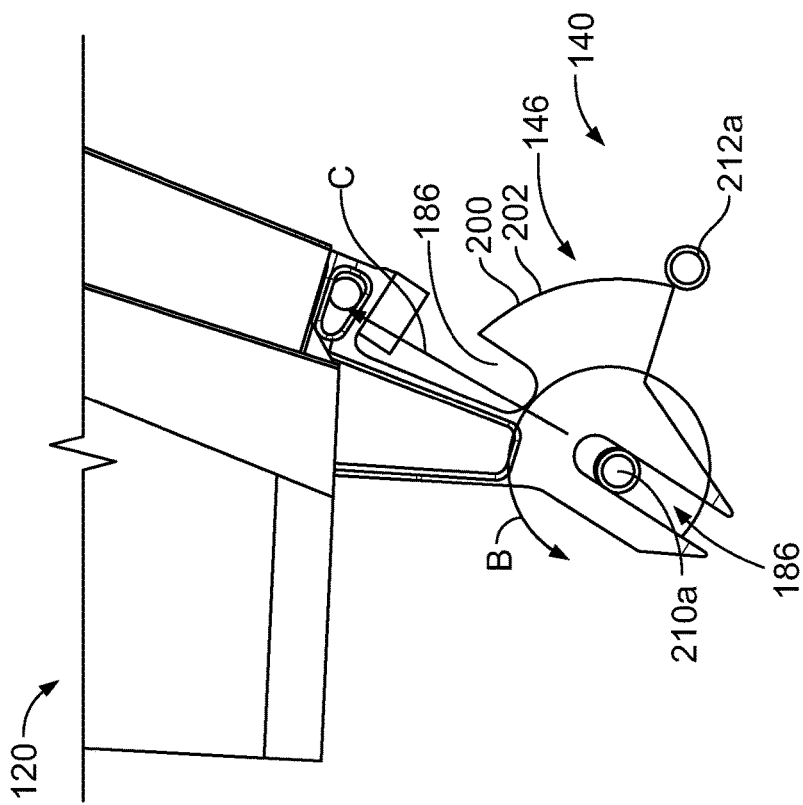
FIG. 10 illustrates a lateral view of the second hinge during the second phase of the ejection event.
Figure 9:
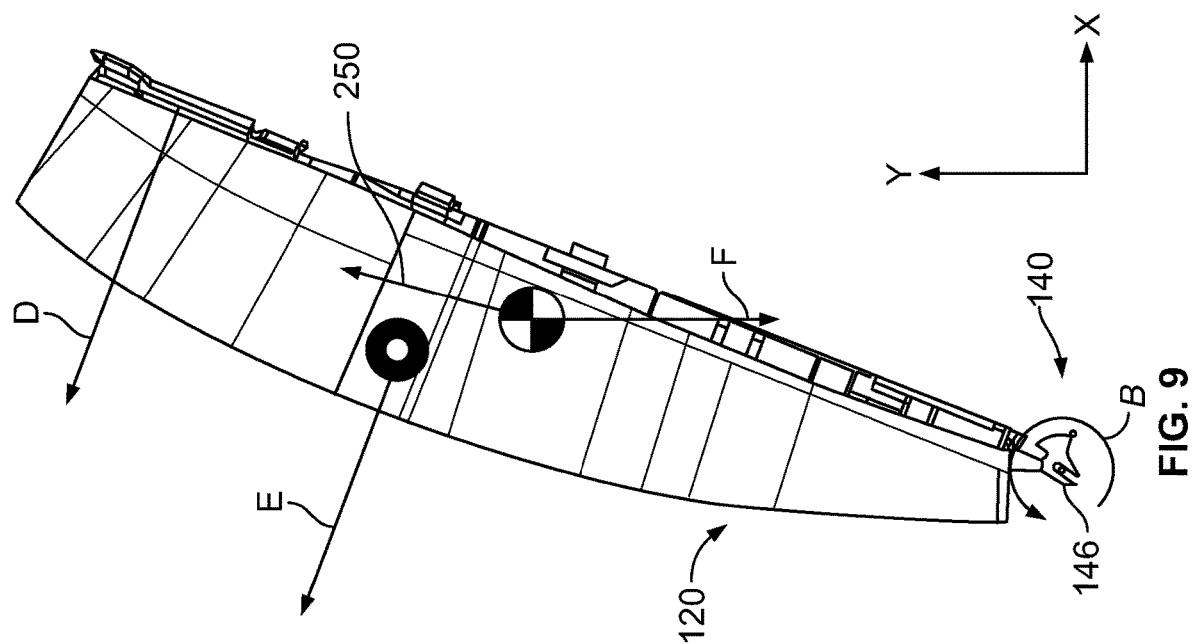
FIG. 9 illustrates a lateral view of the canopy during the second phase of the ejection event.

FIG. 8 illustrates a perspective lateral view of the pivot assembly 140 during a second phase of an ejection event, according to an embodiment of the present disclosure. FIG. 9 illustrates a lateral view of the canopy 120 during the second phase of the ejection event. FIG. 10 illustrates a lateral view of the second hinge 146 during the second phase of the ejection event. Referring to FIGS. 8-10, while the canopy 120 rotates about the aft pins 210a, 210b in the direction of arcs B, the hinge cams 200 ride against the fore pins 212a, 212b, thereby constraining motion of the canopy 120 to rotation about the aft pins 210a, 210b. Once the fore pins 212a, 212b are free of the hinge cams 200, the canopy 120 is free to translate radially in the direction of arrows C along the first pivot slot 160 and the second pivot slot 186.

When the hinge cams 174 and 200 are no longer in contact the fore pins 212, translational motion along the first locking slot 168 (shown in FIG. 4) and the second locking slot 194 is no longer constrained. Centrifugal acceleration 250 causes the canopy 120 to translate radially along the first pivot slot 160 and the second pivot slot 186. The canopy 120 continues to rotate about the respective aft pins 210a, 210b within the first pivot slot 160 and the second pivot slot 186. Because both the respective aft pins 210a, 210b are still within the first pivot slot 160 and the second pivot slot 186, rotation of the canopy 120 in the direction of arc B occurs in an X-Y plane. Additional force in the direction of arrow D may be exerted by rocket thrust. Further, aerodynamic force is exerted in the direction of arrow E. Acceleration caused by gravity is exerted in the direction of arrow F.

Figure 11:
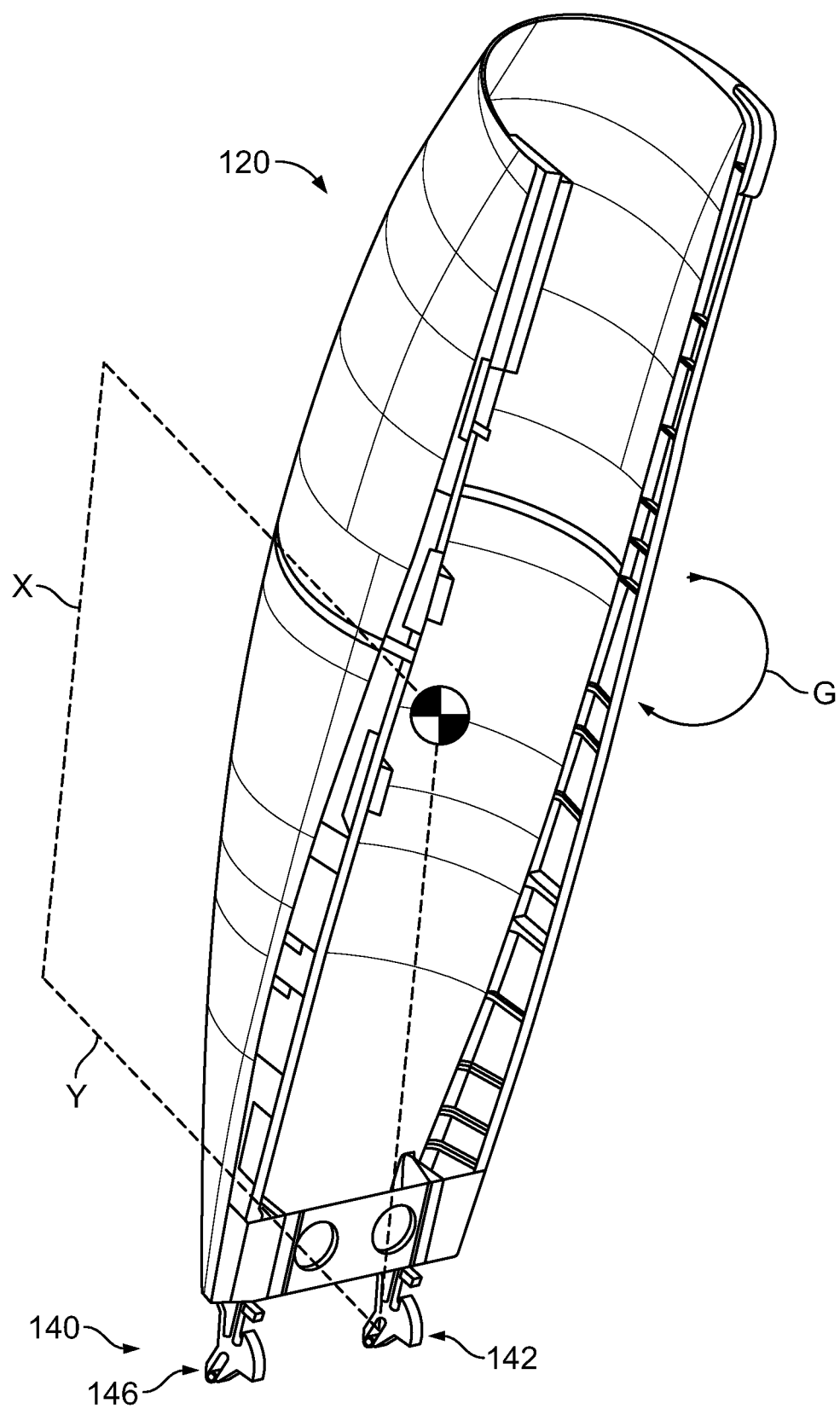
FIG. 11 illustrates a perspective front view of the canopy during a third phase of the ejection event, according to an embodiment of the present disclosure.
Figure 12:
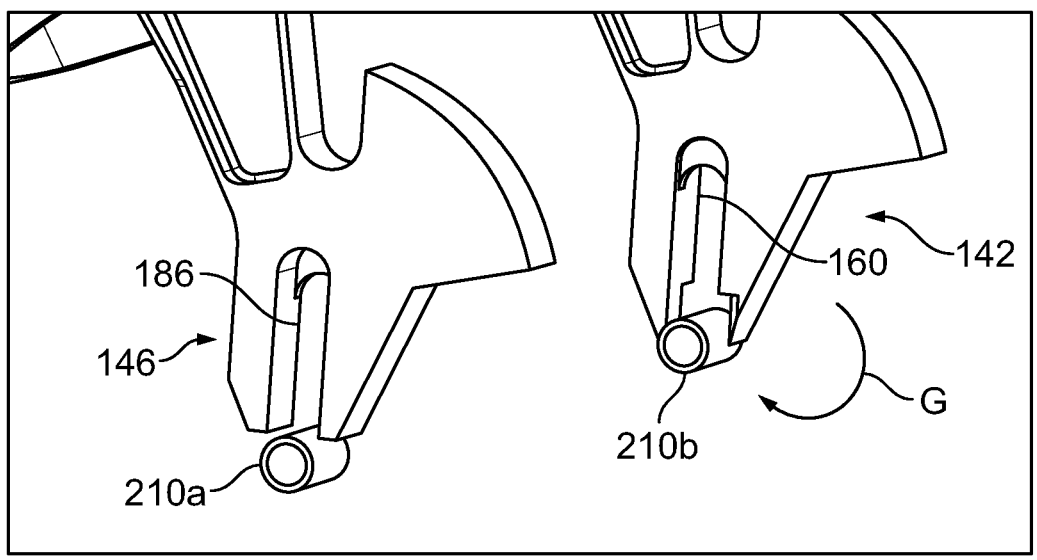
FIG. 12 illustrates a perspective view of the pivot assembly during the third phase of the ejection event.

FIG. 11 illustrates a perspective front view of the canopy 120 during a third phase of the ejection event, according to an embodiment of the present disclosure. FIG. 12 illustrates a perspective view of the pivot assembly 140 during the third phase of the ejection event. Referring to FIGS. 4, 11, and 12, because the first pivot slot 160 is longer than the second pivot slot 186, the aft pin 210a remains in the first pivot slot 160 longer than the opposite aft pin 210b remains in the second pivot slot 186, thereby causing the canopy 120 to rotate out of the X-Y plane, such as to a side of the X-Y plane. That is, when both the aft pins 210a, 210b are engaged within the first and second pivot slots 160 and 186, all rotation occurs with respect to the X-Y plane. However, when the second hinge 142 disengages from the aft pin 210b (because of the shorter length L2), the canopy 120 rotates about a single point, namely the aft pin 210a within the first pivot slot 160. As such, the plane of rotation is no longer constrained in relation to the X-Y plane, and the canopy 120 rotates rearwardly and off to a side.

Referring to FIGS. 4, 5, 11, and 12, the chamfer(s) 232 ensure that the first hinge 142 and the second hinge 146 do not bind or otherwise remain coupled to the aft pins 210a, 210b. Net torque causes the canopy to rotate and roll about the aft pin 210a within the first slot 160 in the direction of arc G. The chambers 232 allow unimpeded rolling motion of the pivot assembly 140. As the canopy rolls rearwardly and to a side, forces due to rocket thrust and aerodynamic loads cause the canopy 120 to roll rearwardly and off to a side about the pivot point of the aft pin 210a within the first pivot slot 160.

FIG. 13 illustrates a lateral view of the aircraft 100 as the canopy 120 separates from the fuselage 108, according to an embodiment of the present disclosure. FIG. 14 illustrates a top view of the aircraft 100 as the canopy 120 separates from the fuselage 108. Referring to FIGS. 1-14, the difference in lengths L1 and L2 cause the canopy 120 to separate from the fuselage and move along a trajectory 300 that is below and laterally shifted from a trajectory 302 of an ejection seat. As such, the pivot assembly 140 having the first hinge 142 with the length L1 and the second hinge with the length L2 reduces a potential of the jettisoned canopy colliding with the ejection seat. It is to be understood that the trajectories 300 and 302 shown in FIGS. 13 and 14 are not to scale.

Figure 15:
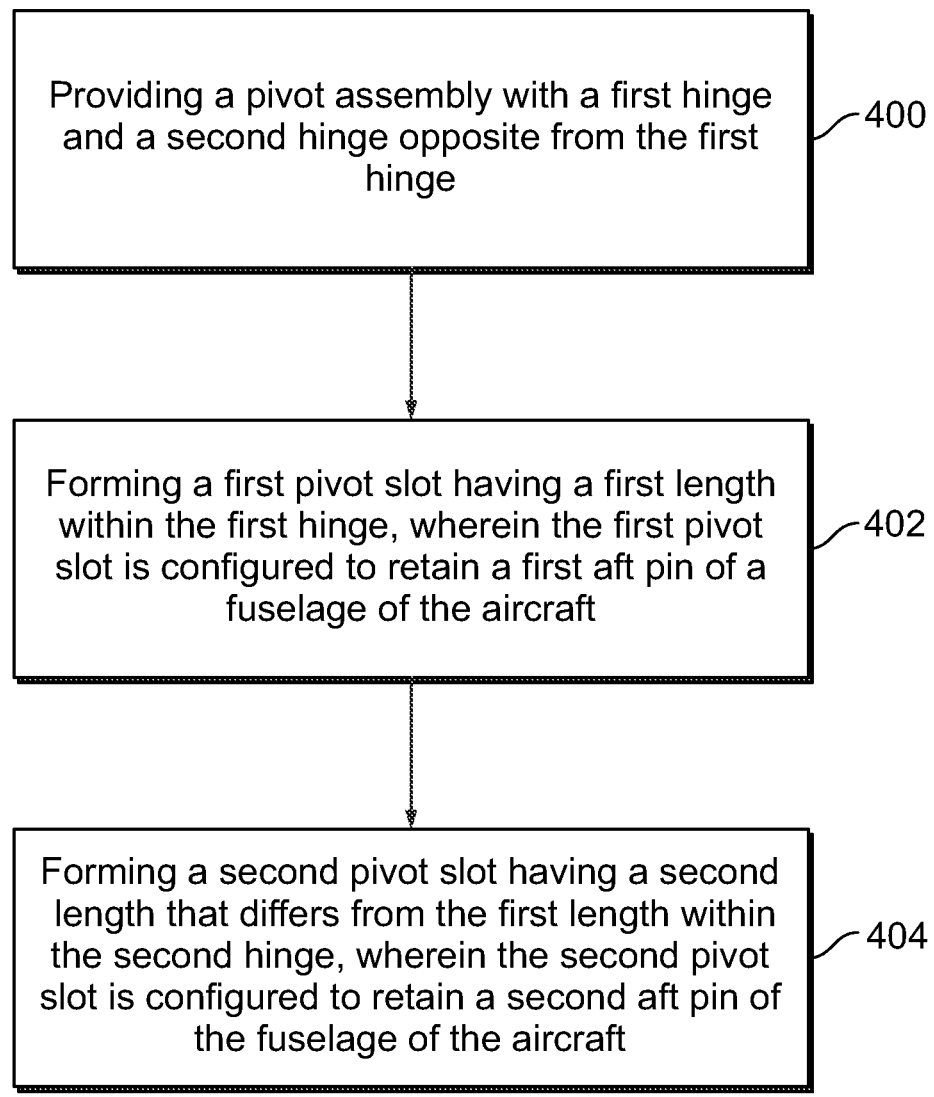
FIG. 15 illustrates a flow chart of a method of forming a canopy of an aircraft, according to an embodiment of the present disclosure.

FIG. 15 illustrates a flow chart of a method of forming a canopy of an aircraft, according to an embodiment of the present disclosure. The method includes providing, at 400, a pivot assembly with a first hinge and a second hinge opposite from the first hinge; forming, at 402, a first pivot slot having a first length within the first hinge, wherein the first pivot slot is configured to retain a first aft pin of a fuselage of the aircraft; and forming, at 404, a second pivot slot having a second length that differs from the first length within the second hinge, wherein the second pivot slot is configured to retain a second aft pin of the fuselage of the aircraft.

In at least one embodiment, the first length is longer than the second length by a distance that is substantially equal to a radius of one or both of the first aft pin or the second aft pin. As an example, the first length exceeds the second length by approximately 0.5 inches.

In at least one embodiment, the method further includes forming one or more chamfers on one or both of the first hinge or the second hinge. For example, the forming the one or more chamfers includes sloping the one or more chamfers from a pin-engaging surface to an interior surface.

Further, the disclosure comprises embodiments according to the following clauses:

Clause 1. A canopy for an aircraft, the canopy comprising:
a pivot assembly comprising a first hinge and a second hinge opposite from the first hinge,
wherein the first hinge comprises a first pivot slot having a first length, wherein the first pivot slot is configured to retain a first aft pin of a fuselage of the aircraft,
wherein the second hinge comprises a second pivot slot having a second length, wherein the second pivot slot is configured to retain a second aft pin of the fuselage of the aircraft, and
wherein the first length differs from the second length.

Clause 2. The canopy of Clause 1, wherein the first length is longer than the second length by a distance that is substantially equal to a radius of one or both of the first aft pin or the second aft pin.

Clause 3. The canopy of Clauses 1 or 2, wherein the first length exceeds the second length by approximately 0.5 inches.

Clause 4. The canopy of any of Clauses 1-3, wherein one or both of the first hinge or the second hinge further comprises one or more chamfers.

Clause 5. The canopy of Clause 4, wherein the one or more chamfers slope from a pin-engaging surface to an interior surface.

Clause 6. The canopy of any of Clauses 1-5, wherein the first hinge further comprises a first fork having a first upper prong separated from a first lower prong by the first pivot slot, and wherein the second hinge further comprises a second fork having a second upper prong separated from a second lower prong by the second pivot slot.

Clause 7. The canopy of Clause 6, wherein the first hinge further comprises a first intermediate body having a first locking slot configured to retain a first fore pin of the fuselage of the aircraft, and wherein the second hinge further comprises a second intermediate body having a second locking slot configured to retain a second fore pin of the fuselage of the aircraft.

Clause 8. The canopy of Clause 7, wherein the first hinge further comprises a first hinge cam extending from the first intermediate body, and wherein the second hinge further comprises a second hinge cam extending from the second intermediate body.

Clause 9. The canopy of any of Clauses 1-8, further comprising a transparent cover secured to a frame, wherein the pivot assembly extends from the frame.

Clause 10. The canopy of Clause 9, wherein the pivot assembly rearwardly extends from an aft end of the frame.

Clause 11. A method of forming a canopy for an aircraft, the method comprising:
providing a pivot assembly with a first hinge and a second hinge opposite from the first hinge;
forming a first pivot slot having a first length within the first hinge, wherein the first pivot slot is configured to retain a first aft pin of a fuselage of the aircraft; and
forming a second pivot slot having a second length that differs from the first length within the second hinge, wherein the second pivot slot is configured to retain a second aft pin of the fuselage of the aircraft.

Clause 12. The method of Clause 11, wherein the first length is longer than the second length by a distance that is substantially equal to a radius of one or both of the first aft pin or the second aft pin.

Clause 13. The method of Clauses 11 or 12, wherein the first length exceeds the second length by approximately 0.5 inches.

Clause 14. The method of any of Clauses 11-13, further comprising forming one or more chamfers on one or both of the first hinge or the second hinge.

Clause 15. The method of Clause 14, wherein said forming the one or more chamfers comprises sloping the one or more chamfers from a pin-engaging surface to an interior surface.

Clause 16. An aircraft comprising:
a fuselage including a first aft pin, a second aft pin, a first fore pin, and a second fore pin; and
a canopy moveably coupled to the fuselage, wherein the canopy is configured to be move between an open position and closed position, the canopy comprising:
a transparent cover secured to a frame; and
a pivot assembly extending from the frame, wherein the pivot assembly includes a first hinge and a second hinge opposite from the first hinge,
wherein the first hinge comprises a first fork having a first upper prong separated from a first lower prong by a first pivot slot having a first length, wherein the first pivot slot retains the first aft pin, a first intermediate body having a first locking slot that retains the first fore pin, a first hinge cam extending from the first intermediate body,
wherein the second hinge comprises a second fork having a second upper prong separated from a second lower prong by a second pivot slot having a second length, wherein the second pivot slot retains the second aft pin, a second intermediate body having a second locking slot that retains the second fore pin, and a second hinge cam extending from the second intermediate body, and
wherein the first length differs from the second length.

Clause 17. The aircraft of Clause 16, wherein the first length is longer than the second length by a distance that is substantially equal to a radius of one or both of the first aft pin or the second aft pin.

Clause 18. The aircraft of Clauses 16 or 17, wherein the first length exceeds the second length by approximately 0.5 inches.

Clause 19. The aircraft of any of Clauses 16-18, wherein one or both of the first hinge or the second hinge further comprises one or more chamfers.

Clause 20. The aircraft of Clause 19, wherein the one or more chamfers slope from a pin-engaging surface to an interior surface.

As described herein, embodiments of the present disclosure provide systems and methods for safely, efficiently, and effectively separating a canopy from a fuselage of an aircraft during an ejection procedure. Further, embodiments of the present disclosure provide systems and methods that are less costly and less complex than prior systems and methods for canopy separation. Additionally, embodiments of the present disclosure provide systems and methods that do not add weight to the aircraft.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A canopy for an aircraft, the canopy comprising:
   a pivot assembly comprising a first hinge and a second hinge opposite from the first hinge about a centerline of the canopy,
   wherein the first hinge comprises a first pivot slot having a first length, wherein the first pivot slot is configured to retain a first aft pin of a fuselage of the aircraft,
   wherein the second hinge comprises a second pivot slot having a second length, wherein the second pivot slot is configured to retain a second aft pin of the fuselage of the aircraft, wherein the second aft pin is coaxial with the first aft pin, and
   wherein the first length differs from the second length.

2. The canopy of claim 1, wherein the first length is longer than the second length by a distance that is substantially equal to a radius of one or both of the first aft pin or the second aft pin.

3. The canopy of claim 1, wherein the first length exceeds the second length by approximately 0.5 inches.

4. The canopy of claim 1, wherein one or both of the first hinge or the second hinge further comprises one or more chamfers.

5. The canopy of claim 4, wherein the one or more chamfers slope from a pin-engaging surface to an interior surface.

6. The canopy of claim 1, wherein the first hinge further comprises a first fork having a first upper prong separated from a first lower prong by the first pivot slot, and wherein the second hinge further comprises a second fork having a second upper prong separated from a second lower prong by the second pivot slot.

7. The canopy of claim 6, wherein the first hinge further comprises a first intermediate body having a first locking slot configured to retain a first fore pin of the fuselage of the aircraft, and wherein the second hinge further comprises a second intermediate body having a second locking slot configured to retain a second fore pin of the fuselage of the aircraft.

8. The canopy of claim 7, wherein the first hinge further comprises a first hinge cam extending from the first intermediate body, and wherein the second hinge further comprises a second hinge cam extending from the second intermediate body.

9. The canopy of claim 1, further comprising a transparent cover secured to a frame, wherein the pivot assembly extends from the frame.

10. The canopy of claim 9, wherein the pivot assembly rearwardly extends from an aft end of the frame.

11. A method of forming a canopy for an aircraft, the method comprising:
    providing a pivot assembly with a first hinge and a second hinge opposite from the first hinge about a centerline of the canopy;
    forming a first pivot slot having a first length within the first hinge, wherein the first pivot slot is configured to retain a first aft pin of a fuselage of the aircraft; and
    forming a second pivot slot having a second length that differs from the first length within the second hinge, wherein the second pivot slot is configured to retain a second aft pin of the fuselage of the aircraft, and wherein the second aft pin is coaxial with the first aft pin.

12. The method of claim 11, wherein the first length is longer than the second length by a distance that is substantially equal to a radius of one or both of the first aft pin or the second aft pin.

13. The method of claim 11, wherein the first length exceeds the second length by approximately 0.5 inches.

14. The method of claim 11, further comprising forming one or more chamfers on one or both of the first hinge or the second hinge.

15. The method of claim 14, wherein said forming the one or more chamfers comprises sloping the one or more chamfers from a pin-engaging surface to an interior surface.

16. An aircraft comprising:
    a fuselage including a first aft pin, a second aft pin, a first fore pin, and a second fore pin; and
    a canopy moveably coupled to the fuselage, wherein the canopy is configured to be move between an open position and closed position, the canopy comprising:
    a transparent cover secured to a frame; and
    a pivot assembly extending from the frame, wherein the pivot assembly includes a first hinge and a second hinge opposite from the first hinge about a centerline of the canopy,
    wherein the first hinge comprises a first fork having a first upper prong separated from a first lower prong by a first pivot slot having a first length, wherein the first pivot slot retains the first aft pin, a first intermediate body having a first locking slot that retains the first fore pin, a first hinge cam extending from the first intermediate body,
    wherein the second hinge comprises a second fork having a second upper prong separated from a second lower prong by a second pivot slot having a second length, wherein the second pivot slot retains the second aft pin, a second intermediate body having a second locking slot that retains the second fore pin, and a second hinge cam extending from the second intermediate body, and
    wherein the first length differs from the second length.

17. The aircraft of claim 16, wherein the first length is longer than the second length by a distance that is substantially equal to a radius of one or both of the first aft pin or the second aft pin.

18. The aircraft of claim 16, wherein the first length exceeds the second length by approximately 0.5 inches.

19. The aircraft of claim 16, wherein one or both of the first hinge or the second hinge further comprises one or more chamfers.

20. The aircraft of claim 19, wherein the one or more chamfers slope from a pin-engaging surface to an interior surface.

21. The aircraft of claim 16, wherein the second aft pin is coaxial with the first aft pin.

* * * * *